July 9, 1957    F. N. LEE ET AL    2,798,235
HEEL SEAT FITTING MACHINES
Filed Feb. 3, 1955    10 Sheets-Sheet 1

Inventors
Ferman N. Lee
Harold G. Shaw
By their Attorney

July 9, 1957
F. N. LEE ET AL
2,798,235
HEEL SEAT FITTING MACHINES
Filed Feb. 3, 1955
10 Sheets-Sheet 4
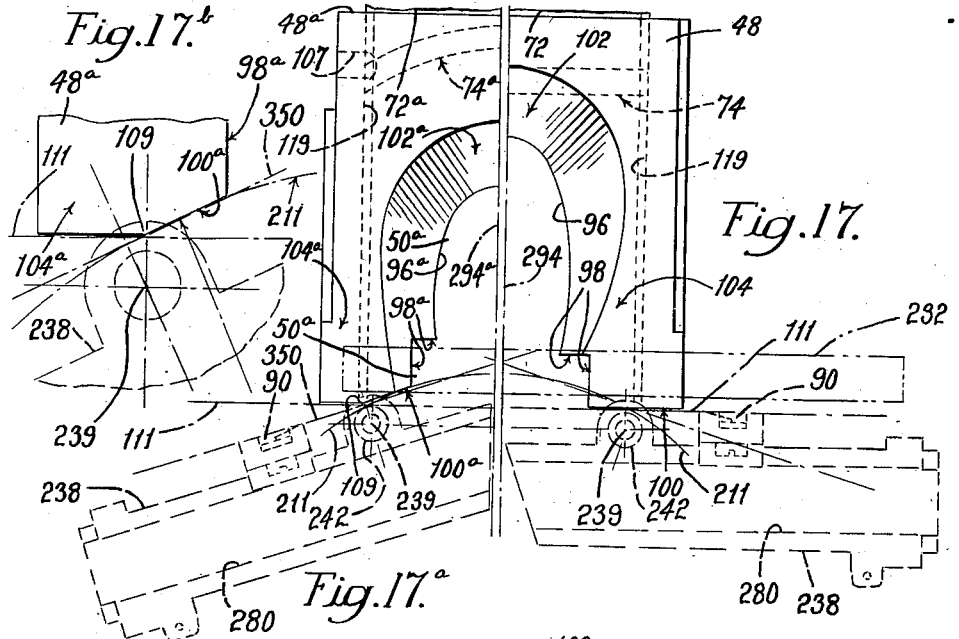
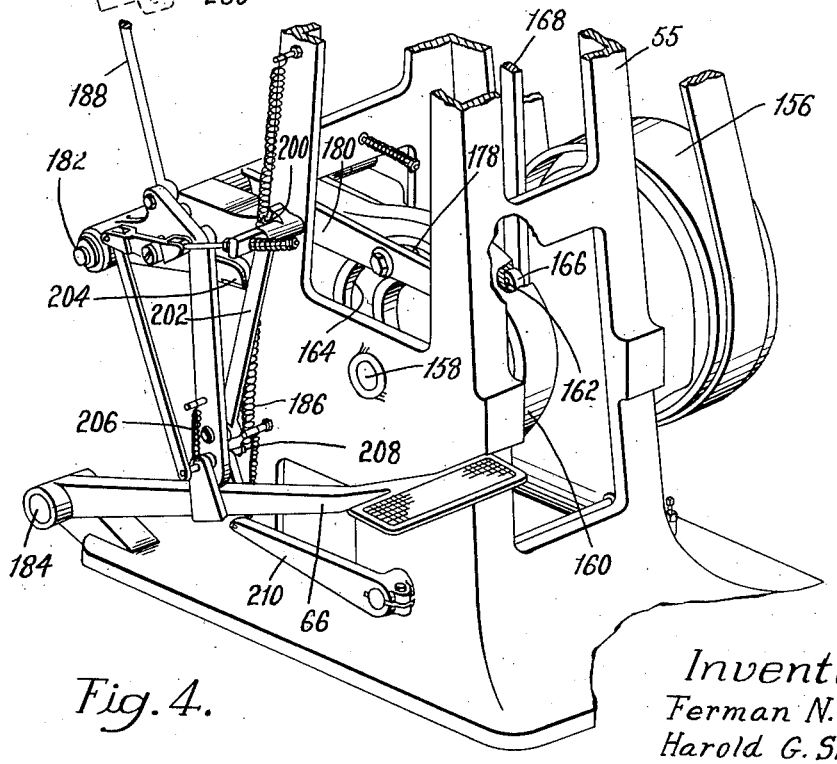
Fig. 4.
Inventors
Ferman N. Lee
Harold G. Shaw
By their Attorney

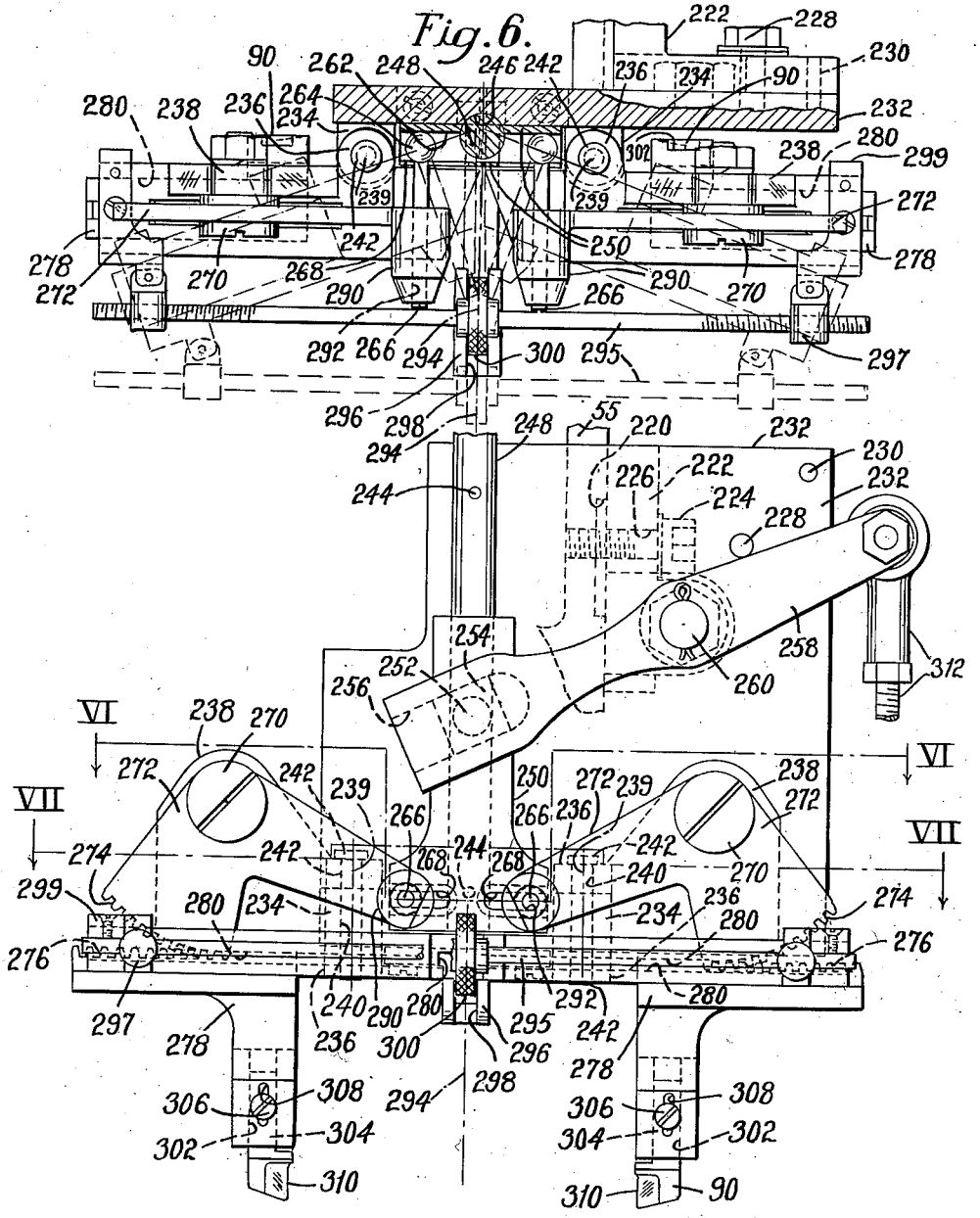

Inventors
Ferman N. Lee
Harold G. Shaw
By their Attorney

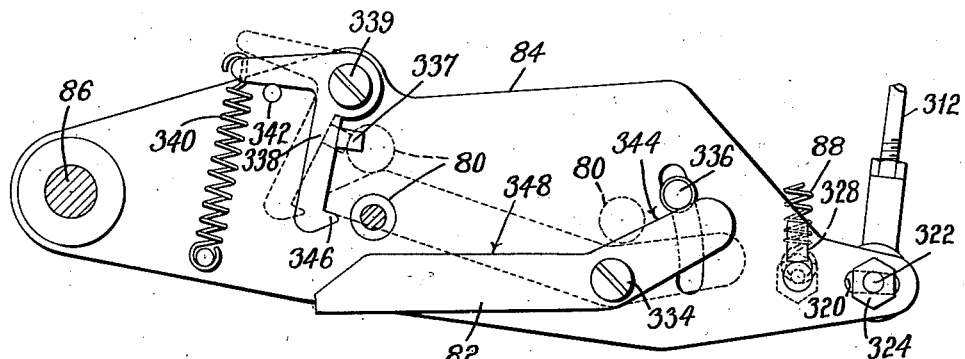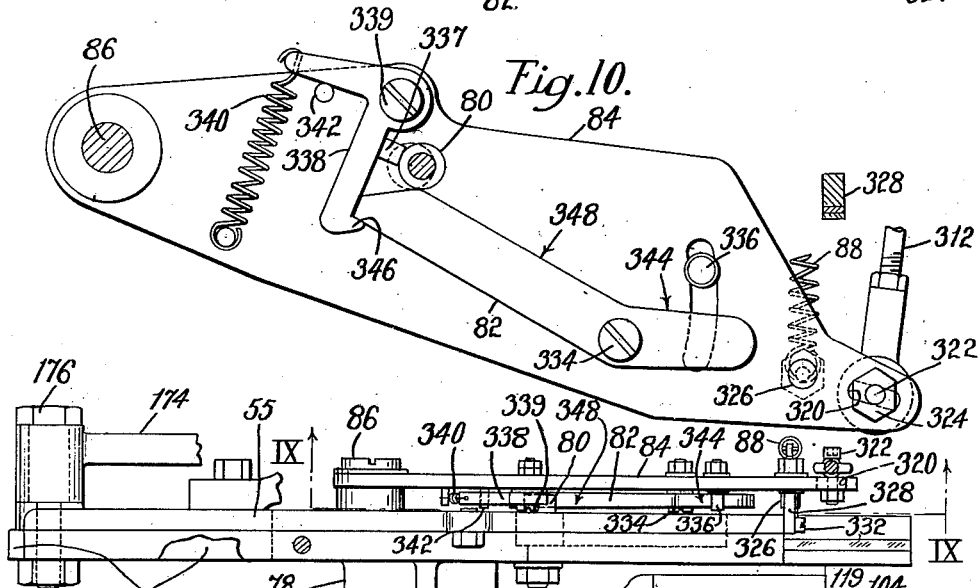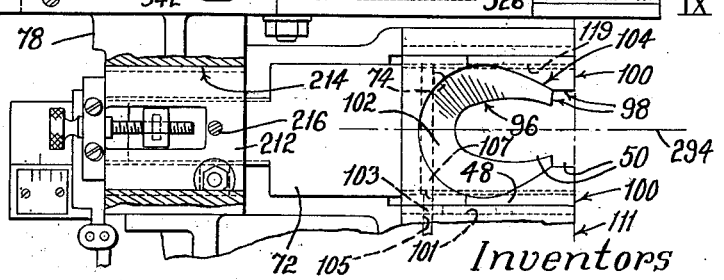

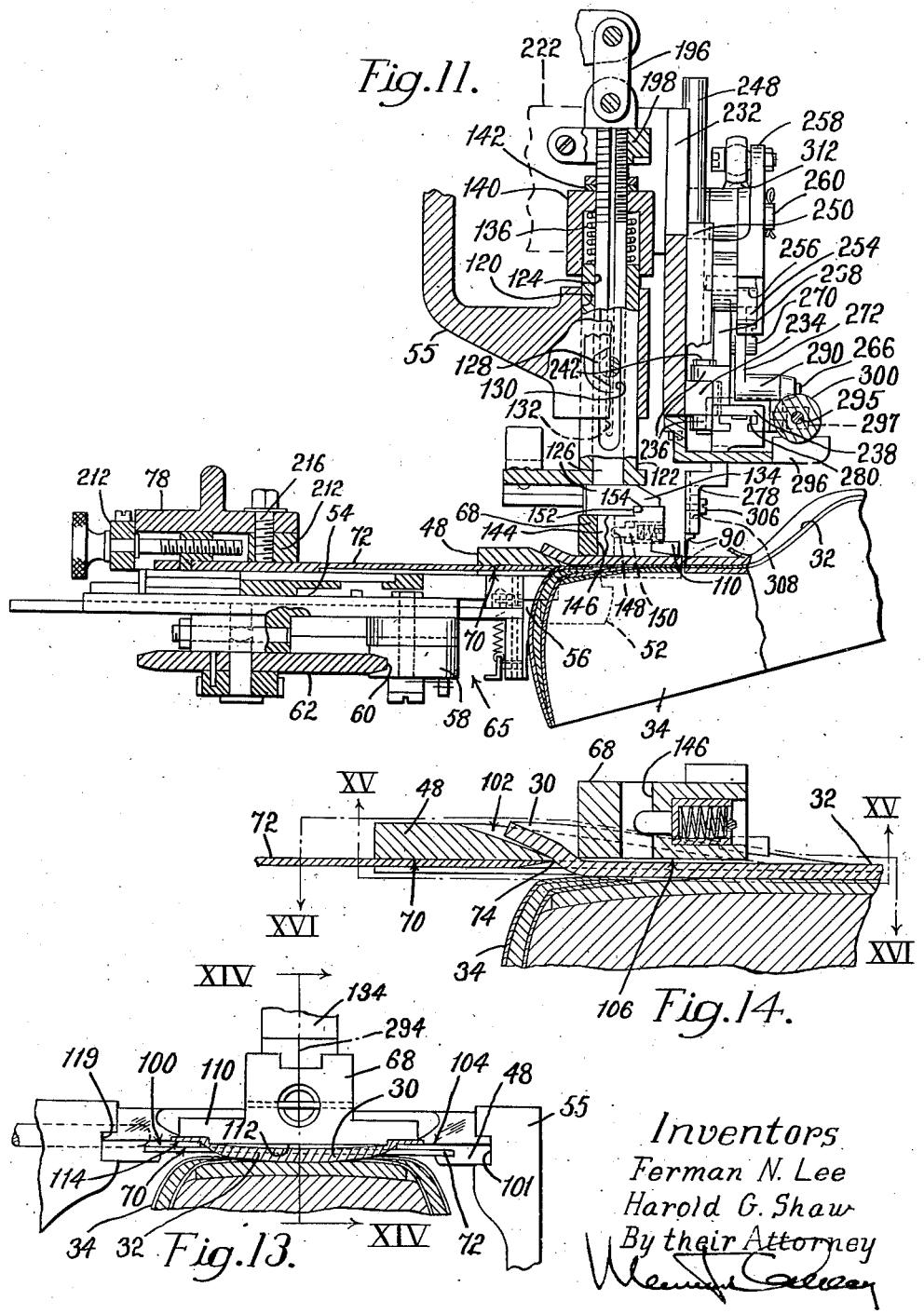

July 9, 1957 F. N. LEE ET AL 2,798,235
HEEL SEAT FITTING MACHINES
Filed Feb. 3, 1955 10 Sheets-Sheet 9
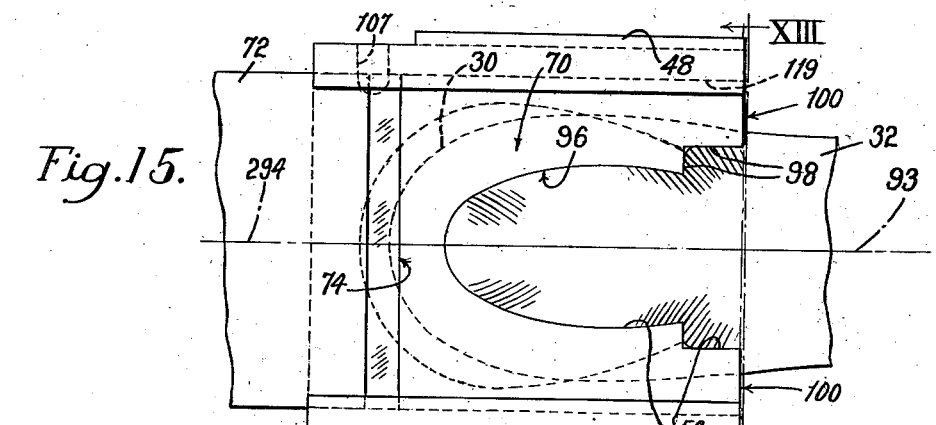
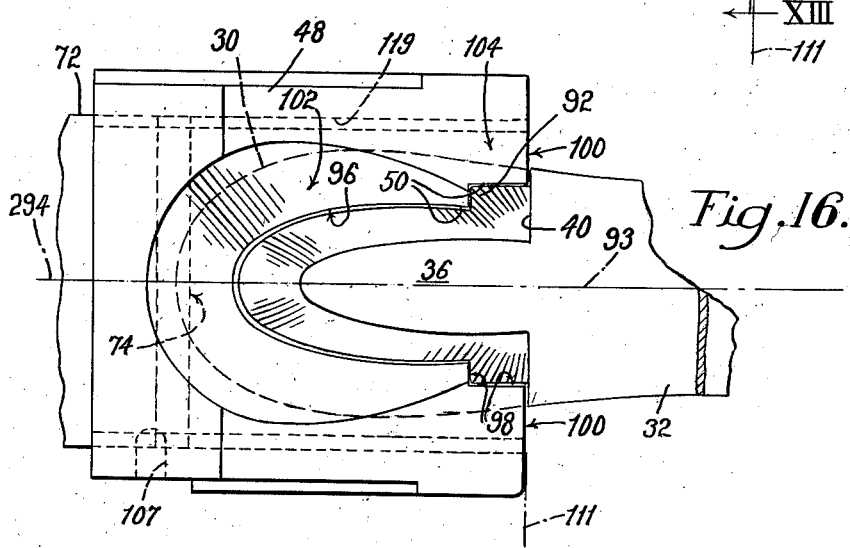
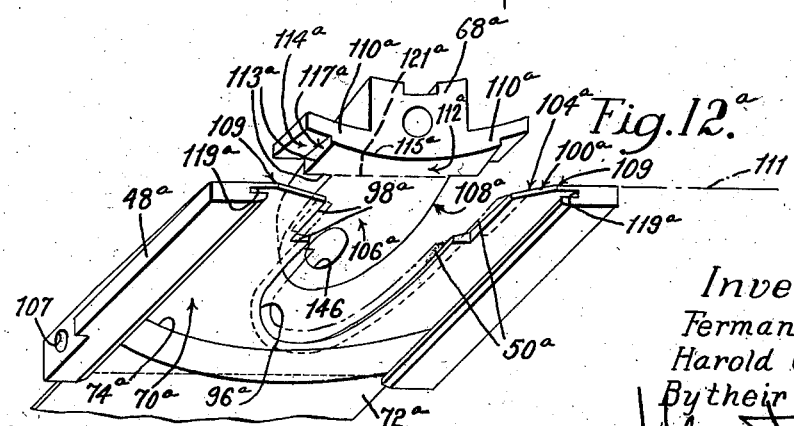
Inventors
Ferman N. Lee
Harold G. Shaw
By their Attorney Inventors
Ferman N. Lee
Harold G. Shaw
By their Attorney

United States Patent Office 2,798,235
Patented July 9, 1957

2,798,235

HEEL SEAT FITTING MACHINES

Ferman N. Lee, Danvers, and Harold G. Shaw, Beverly, Mass., assignors to United Shoe Machinery Corporation, Flemington, N. J., a corporation of New Jersey Application February 3, 1955, Serial No. 485,844

12 Claims. (Cl. 12—31.5)

This invention relates to heel seat fitting machines and is illustrated as embodied in an improved machine of the general type disclosed in United States Letters Patent No. 1,980,371, granted November 13, 1934, on an application filed in the name of Earl A. Bessom.

As explained in United States Letters Patent No. 2,071,326, granted February 23, 1937, on an application filed in the name of Earl A. Bessom, and disclosing an improvement on the machine disclosed in said Patent No. 1,980,371, in the fitting of an attached outsole of a shoe for the reception of a wood heel it is desirable to form, just rearward of heel breast receiving shoulders formed on the outsole, fillets which may be considered parts of a heel seat tab formed on said outsole and which in the finished shoe overlie the forward lateral portions of the attaching face of the heel, thus preventing the rear lateral margins of the shank portion of the outsole of the shoe from sagging away from the upper of the shoe. It has been found that fillets cannot be properly formed consistently upon outsoles of different thicknesses and consistencies of leather by the use of the machine disclosed in Patent No. 2,071,326. Furthermore, as explained in an application for United States Letters Patent Serial No. 345,913, now abandoned, filed March 31, 1953, in our names, it has been found that unless the fillets of the fitted heel seat provided by the use of the above machine are perfectly formed and positioned, at least one of said fillets prevents a corresponding corner of the attaching face of the heel from being effectively forced against the overlasted margin of the shoe upper and in many cases is visible between the heel and said overlasted margin, thereby marring the appearance of the shoe. The above and other drawbacks which are due in part to improper outsole laying and to other causes have resulted in the development of an improved heel seat such as is disclosed in the above-mentioned application Serial No. 345,913.

It is an object of the present invention to provide a machine for quickly and accurately forming upon attached outsoles of shoes improved fitted heel seats such as disclosed in said application Serial No. 345,913. With the above considerations in view we have provided an improved combination of crease plate, bulger, heel seat reducing knife and shoulder forming knives adapted quickly and effectively to produce improved fitted heel seats for the reception of both Louis and Cuban heels. The present invention consists in the novel features hereinafter described, reference being had to the accompanying drawings which illustrate one embodiment of the invention selected for purposes of illustration, said invention being fully disclosed in the following description and claims.

In the drawings,

Fig. 4 is a view showing in perspective a base portion of the machine;

Fig. 5 is a view showing in front elevation and on an enlarged scale portions of mechanism of said machine for forming heel breast receiving shoulders upon an attached outsole of the shoe;

Fig. 6 is a view partially on the line VI—VI of Fig. 5;

Fig. 8 is a view, partly in section on the line VIII—VIII of Fig. 2, showing mechanism for operating the shoulder forming knives and also showing a crease plate for use in operating upon Louis work, a tab forming knife and its holder and operating mechanism to which the holder is secured;

Figs. 9 and 10 are views on the line IX—IX of Fig. 8 showing portions of the mechanism for operating the shoulder forming knives during two different portions of the operating cycle of the machine;

Fig. 11 is a view showing partly in side elevation and partly in section on the line XI—XI of Fig. 2 a portion of the head of the machine in the process of operating upon a shoe which is to receive a Louis heel;

Fig. 12a is a view showing in perspective a crease plate and a bulger used in the machine during the fitting of outsoles of shoes for the reception of Cuban heels;

Fig. 13 is a view on the line XIII—XIII of Fig. 15 illustrating the crease plate and the bulger which are shown in Fig. 12 and between which the heel seat portion of the outsole of the shoe has been deformed preparatory to operating the tab forming knife;

Fig. 14 is a section on the line XIV—XIV of Fig. 13 showing the relation of the crease plate, the bulger and the heel seat portion of the outsole of the shoe at the time the tab forming knife has started forward;

Fig. 15 is a view on the line XV—XV of Fig. 14;

Fig. 16 is a view on the line XVI—XVI of Fig. 14 showing the work just before it is removed from the machine, the bulger and a horseshoe-shaped piece of leather, which has been trimmed from said heel seat portion of the outsole, having been removed;

Figs. 17, 17a and 17b are illustrative views for use in describing the adjustment of guide blocks which carry the shoulder forming knives into different operative positions to accommodate Louis and Cuban work;

Figure 18:
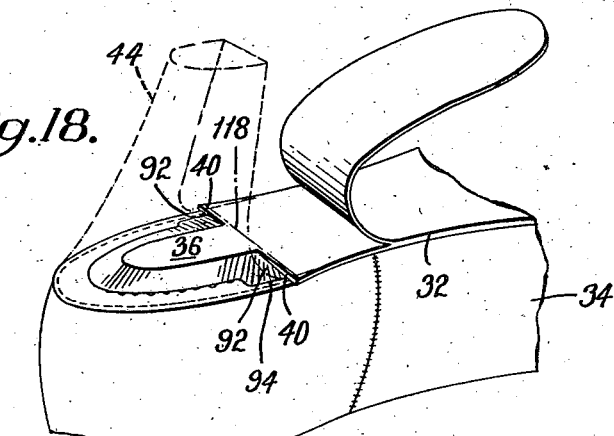
Figure 19:
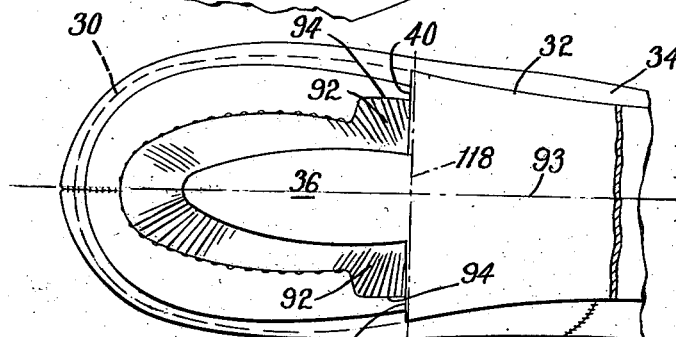
Figure 20:
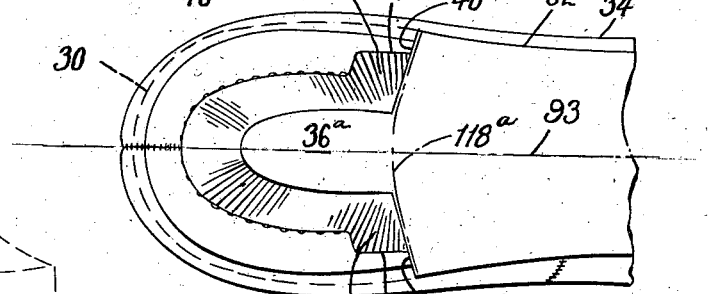
Figure 21:
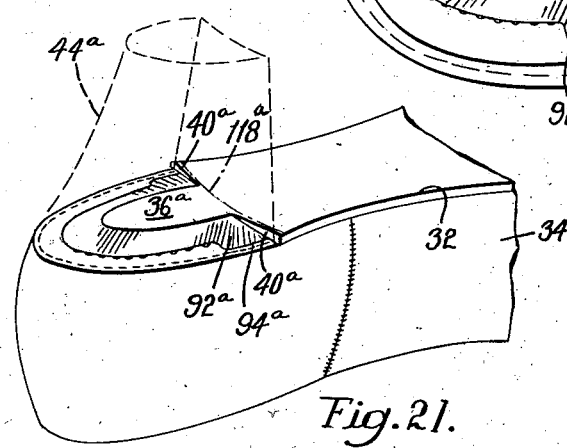

Figs. 18 and 19 are angular and plan views respectively showing the rear part of a shoe the heel seat portion of the outsole of which has been fitted for the reception of a Louis heel by the use of the illustrative machine; and Figs. 20 and 21 are plan and angular views respectively showing the rear part of a shoe the heel seat portion of the outsole of which has been fitted for the reception of a Cuban heel by the machine.

The illustrative machine is described with reference to fitting the heel seat portion 30 of an attached outsole 32 of a shoe 34 to form heel seat tabs 36, 36a and heel breast receiving shoulders 40, 40a adapted to receive respectively Louis and Cuban heels 44 (Fig. 18), 44a (Fig. 21)

and comprises interchangeable Louis and Cuban crease plates 48, 48$^a$ which have openings 50, 50$^a$ respectively and to which the shoe, arranged bottom up and heel end first, is presented, portions of the plate surrounding the openings being shaped and arranged to receive the rand crease of the shoe to support said shoe.

The rear end of the shoe 34, the forepart of which is grasped by the operator as he slides the shoe rearward onto the crease plates 48, 48$^a$, is positioned widthwise in the machine by a fork 52 (Figs. 2, 3 and 11) slidable forward and rearward in opposed guideways 54 of a main frame 55 of the machine. As the fork 52 is moved rearward by pressure of the shoe 34 against it, the rear counter portion of the shoe engages a back gage 56 which, as the shoe continues to be moved rearward, moves rearward together with said fork until an abutment or block 58 movable in response to movement of the back gage engages a spiral stop face 60 of a cam 62 to limit rearward movement of the back gage and accordingly to position the shoe lengthwise in the machine. The cam 62 is initially set in an adjusted position in accordance with the length of the Louis heel 44 or the Cuban heel 44$^a$ which is to be attached to the shoe and is measured by a heel measuring gage 64. The heel measuring gage 64, the back gage 56, mechanism for setting the cam 62 in accordance with the measured length of the Louis or Cuban heel in the gage, and a slide unit 65 comprising the fork, the back gage 56 and the abutment 58 are disclosed in detail in United States Letters Patent No. 2,398,796, granted April 23, 1946 on an application filed in the name of Ralph S. Megathlin, and accordingly need not be further described in detail herein.

Preparatory to trimming the heel seat portion 30 of the attached outsole 32 of the shoe 34 the median part of said heel seat portion is forced, in response to depression of a treadle 66, by a bulger 68, 68$^a$ through the opening 50, 50$^a$ in the crease plate 48, 48$^a$ and below a flat or planar bottom surface or face 70, 70$^a$ of said plate. The median part of the heel seat portion 30 of the outsole 32 of the shoe 34 is next forced slightly further through the opening 50, 50$^a$ in the crease plate 48, 48$^a$ by force applied to the bulger 68, 68$^a$ during the power cycle of the machine, which power cycle is initiated by tripping a one-revolution clutch (not shown) in response to further downward movement of the treadle 66 (Fig. 4), then a back, heel seat reducing or tab forming knife 72, 72$^a$, which has a cutting edge 74, 74$^a$ arranged in a plane, moves along the flat bottom surface 70, 70$^a$ of the crease plate 48, 48$^a$ to trim by a beveling cut the margin of the heel seat portion of the outsole to form the heel seat tab 36, 36$^a$. As a slide 76 which is movable in a horizontal guideway 77 of the main frame 55 and has a horizontal lug 78 to which the back knife 72 is secured by mechanism hereinafter described, travels forward, a roll 80 carried by the slide 76 swings a cam 82 journaled upon a lever 84, which is pivoted on a bearing pin 86 secured to the main frame 55, into a latched position (shown in dotted lines Fig. 9 and full lines Fig. 10) on said lever with the result that upon retractive or rearward movement of the slide 76 said cam, acted upon by the roll 80 actuates, against the action of a spring 88 and through mechanism hereinafter described, shoulder forming knives 90 inward from opposite sides of the outsole 32 of the shoe 34 to form the heel breast receiving shoulders 40, 40$^a$. After the machine has completed its power cycle and the shoulder forming knives 90 have returned by spring action to their starting or rest positions at opposite sides of the shoe, the treadle 66 is released and the work is removed from the machine, the bulger 68 or 68$^a$, the fork 52 and the back gage 56 returning to their idle positions by spring action.

As fully explained in application Serial No. 345,913, the heel seat tabs 36, 36$^a$ have formed at the opposite sides of their base portions pairs of wings 92, 92a which diminish in thickness as they extend rearward from the heel breast receiving shoulders 40, 40$^a$ and outward from a longitudinal median plane 93 of the outsole and which have lateral edges 94, 94$^a$ extending generally lengthwise of the outsole and terminating at points spaced substantial distances inward from the outer ends or edges of the heel breast receiving shoulders 40, 40$^a$. The wings 92, 92$^a$ will be described as being beveled rearward and outward of the outsole.

The openings 50, 50$^a$ of the crease plates 48, 48$^a$ are defined respectively by U-shaped edges 96, 96$^a$ and by spaced angularly disposed or angled edges 98, 98$^a$ which are continuous respectively with the forward ends of said U-shaped edges and extend outward from the U-shaped edges and then forward in the form of steps to front, forward or breast edges 100, 100$^a$ of the crease plates. The U-shaped edges 96, 96$^a$ extend between the bottom or knife receiving faces 70, 70$^a$ of the crease plates 48, 48$^a$ and beveled horseshoe-shaped, upper or outsole supporting faces 102, 102$^a$ of said plates, and the angularly disposed edges 98, 98$^a$ have rear or inner portions which extend between the bottom faces 70, 70$^a$ and the faces 102, 102$^a$ and have outer portions which extend between said bottom faces 70, 70$^a$ and forwardly beveled faces 104, 104$^a$ of the crease plates. The heel seat portion 30 of the outsole 32 of the shoe 34 to be operated upon is somewhat wider than the forward or entrance portions of the openings 50, 50$^a$. The openings 50, 50$^a$ may be described as extending thicknesswise through the crease plates 48, 48$^a$ and as having converging upper or dished faces 102, 102$^a$ and planar or lower faces 70, 70$^a$ which border the openings. The U-shaped edges 96, 96$^a$ define the U-shaped or relatively narrow or rear portions of the openings 50, 50$^a$ and the angularly disposed edges 98, 98$^a$ define forward or relatively wide entrant portions of the openings. Opposed lateral edges of the U-shaped and the entrant portions 50, 50$^a$ are symmetrical.

The crease plates 48, 48$^a$ are readily interchangeable and are secured in their proper operative positions in horizontal guideways 101 of the main frame 55 by a spring-pressed pin 103 which is slidable in a passage 105 of the main frame and enters a bore 107 formed in the crease plate in the machine. The Louis and Cuban crease plates 48, 48$^a$ are so positioned in the guideways 101 that the front or breast edges 100 of the Louis crease plates 48 and the outer ends or edges 109 of the front or breast edges 100$^a$ of the Cuban crease plate 48$^a$ are arranged in a fixed horizontal Louis heel breast line 111 of the machine.

Figure 12:
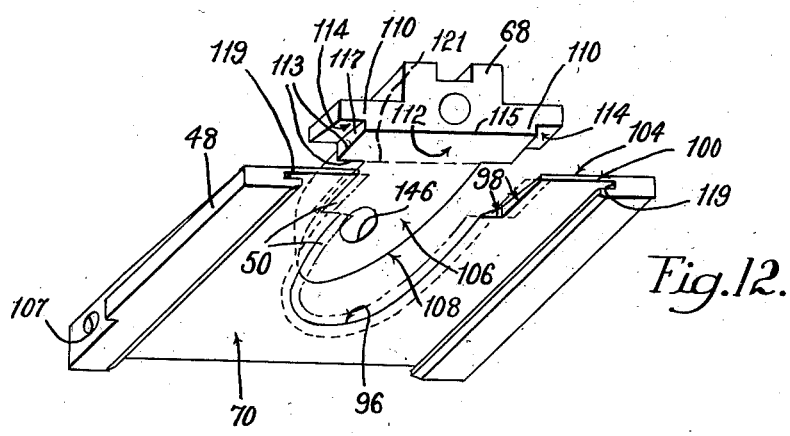
Fig. 12 is a view showing in perspective a crease plate and a bulger used in the machine during the fitting of outsoles of shoes for the reception of Louis heels.

It is common practice to provide three different Louis and Cuban crease plates 48, 48$^a$ for use in operating respectively upon runs of shoes which are to be fitted for the reception of Louis and Cuban heels 44, 44$^a$. The three Louis crease plates 48 for accommodating a run of sizes of shoes to which Louis heels are to be attached have their U-shaped edges 96 and their angularly disposed edges 98 shown respectively in Fig. 12 in full, dash and dash-dot lines and the Cuban crease plates 48$^a$ for accommodating a run of sizes of shoes to which Cuban heels are to be attached have their U-shaped edges 96$^a$ and their angularly disposed edges 98$^a$ shown respectively in Fig. 12$^a$ in full, dash and dash-dot lines. It will be noted that although the lengths and widths of the rear or U-shaped portions of the openings 50 formed by the edges 96 of the three different crease plates 48 vary. the angularly disposed edges 98 of the three different crease plates are of constant size and shape and extend to the breast edges 100, the entrance portions of the different crease plates extending constant distances laterally beyond the forward ends of the edges 96 of associated crease plates. It will also be noted that although the lengths and the widths of the rear or U-shaped portions of the openings 50$^a$ formed by the edges 96$^a$ of the different crease plates 48$^a$ vary, the angularly disposed edges 98$^a$ of different crease plates are of the same size and shape, extend to the edges 100$^a$ and are stepped laterally the same distance beyond the forward ends of the edges 96$^a$.

Since the openings 50ª of the crease plates 48ª terminate at the edges 100ª it will be apparent that the larger the opening 50ª the nearer the opening of the plate positioned in the machine will approach the fixed heel breast line 111 of the machine in which line lie the edges 100 of the crease plate 48 positioned in the machine.

The bulgers 68, 68ª have planar bottom deforming faces 106, 106ª defined by edges 108, 108ª complemental to but substantially smaller than the edges 96, 96ª defining the U-shaped portions of the openings 50, 50ª. When the bottom faces 106, 106ª of the bulgers 68, 68ª, by mechanism hereinafter described, are moved into approximate alinement with the bottom, planar or flat faces 70, 70ª of the crease plates 48, 48ª during the driving cycle of the machine, the median part of the heel seat portion of the outsole is bulged or depressed below the flat bottom faces 70, 70ª of the crease plates, the widths of the gaps formed between the U-shaped edges 96, 96ª of the crease plates and the edges 108, 108ª of the bulgers being equal to or slightly greater than the thickness of the outsole and allowing the outsole to pass through them while the edges grip the outsole firmly with a bending and clamping action and deform it to the desired shape but do not break down the fibre structure of the outsole where it is gripped  The bulgers 68, 68ª have laterally extending wings or flange portions 110, 110ª provided with bottom or deforming faces 112, 112ª which are generally similar in outline to, but only slightly smaller than, the entry portions of the openings 50, 50ª and are continuous and form with the bottom or deforming faces 106, 106ª of the bulgers combined bottom or deforming faces of the bulgers.

The flange portions 110, 110ª of the bulgers 68, 68ª have clamping faces 114, 114ª which are approximately complemental to opposing portions of the forwardly beveled portions 104, 104ª of the crease plates 48, 48ª and which are set back and offset laterally from the faces 112, 112ª respectively. The bulgers 68, 68ª may be described as having stepped laterally projecting portions provided with faces 114, 114ª for forcing the forward lateral margins of the heel seat portions of the outsoles against the crease plates. The planar bottom faces 112, 112ª of the bulgers 68, 68ª are defined by angularly disposed or angled edges 113, 113ª, front or breast edges 115, 115ª and lines 121, 121ª extending between the forward ends of the U-shaped edges 96, 96ª, the edges 113, 113ª, during the outsole deforming or bulging operations, forming with the angularly disposed or angled edges 98, 98ª slight gaps which are narrower than the thickness of the outsole, the construction and arrangement being such that during the bulging or sole deforming operation the forward lateral margins of the heel seat portion of the outsole are pinched or crushed along angular lines. Accordingly, the fibres of the outsole are broken and the outsole is held firmly in its bulged position so that fillets or wings 92, 92ª of the heel seat tab 36, 36ª of the desired size and shape may be formed upon the outsole. The forward lateral margins of the bulgers 68, 68ª may be defined as rabbeted to form on said bulgers shoulders 117, 117ª extending heightwise and lengthwise of the bulgers. The combined bottom faces 106, 106ª, 112, 112ª and the clamping faces 114, 114ª of the bulgers 68, 68ª may be referred to as the leading deforming and the trailing clamping faces respectively of the bulgers.

In order to insure against the tab forming knives 72, 72ª being deflected away from the planar faces 70, 70ª of the crease plates 48, 48ª by the reaction of the outsole against them during the tab forming operation, the crease plates have formed in them guideways or channels 119, 119ª which extend respectively along substantially the entire opposite sides of the faces 70, 70ª and which restrain the cutting edges 74, 74ª of the knives from "dipping" away from the faces 70, 70ª. The channels or guideways 119, 119ª comprise surfaces which are continuous with the faces 70, 70ª of the crease plates 48, 48ª and are adapted to be engaged by the cutting edges 74, 74ª of the knives 72, 72ª.

Vertically slidable in a bore 120 of the main frame 55 is a slide or sleeve 122 which, in the machine disclosed in Patent No. 1,980,371 carries a presser member or clamp not used in the present machine. The sleeve 122 has formed in it a bore 124 in which is slidable a rod 126 to the lower end of which the bulger 68, 68ª is attached. In order to insure that the sleeve 122 and the rod 126 shall not turn about their common axis, the main frame 55 has threaded into it a screw 128 (Fig. 11) having a portion which passes through an elongated slot 130 of the sleeve and another portion of which fits in an elongated slot 132 in the rod.

The sleeve 122 is supported by a holder portion 134 of the rod 126 and is constantly held in engagement with said portion by a spring 136 which is included in a cylindrical housing 140 mounted upon the rod and which has its upper and lower ends in engagement respectively with the housing and the upper end of the sleeve. The upper end of the cylindrical housing 140 constantly engages a nut 142 which is threaded onto and is adjustable with relation to the rod 126 to insure that the bulgers 68, 68ª in their lowered positions shall not extend below the bottom surfaces 70, 70ª of the crease plates 48, 48ª respectively. The rod 126 has at its lower end a stud portion 144 shaped and arranged interchangeably to be received in a hole 146 formed in any one of the bulgers 68, 68ª, said stud portion being provided with a recess 148 shaped and arranged to receive a spring-pressed plunger 150 carried by the bulger. Upon the upper part of the bulger 68 are a pair of shoulders 152 shaped and arranged to abut against shoulders 154 on the holder portion 134 of the rod 126 in order to insure against rotation of the bulger upon the rod.

Power is supplied to the machine by a pulley 156 which, when the machine is idle, rotates continuously upon a shaft 158 rotatably mounted in the main frame 55. Secured to the shaft 158 is a cam 160 in which is formed a pair of cam tracks 162, 164. Fitting in the cam track 162 is a follower roll 166 carried by the lower end of a link 168 the upper end of which is pivoted to the forward end of a bell crank lever 170 secured to a fulcrum pin 172 journaled in the main frame 55. Pivotally connected to an upstanding arm of the bell crank lever 170 is a link 174 the rear end of which is pivoted on a bearing pin 176 secured to the knife slide 76.

Engaging in the cam track 164 is a follower roll 178 carried by an arm 180 which is secured to a shaft 182 rotatably mounted in the main frame 55. The treadle 66, which is pivotally mounted upon a bearing pin 184 secured to the main frame 55 and is constantly urged to its raised position by a spring 186, is operatively connected by mechanism identical with corresponding mechanism disclosed in Patent No. 1,980,371 to a multipart rod 188 which actuates, through a bell crank lever 190, a link 192, a bell crank lever 194, a link 196 and a coupling 198, the rod or carrier 126 which is threaded into the coupling.

After the shoe 34 has been positioned in the machine the operator depresses the treadle 66 causing, through mechanism illustrated in Fig. 4 and described in detail in said Patent No. 1,980,371, depression of the multipart rod 188 and accordingly downward movement of the bulger 68, 68ª against the heel seat portion of the outsole 32 of the shoe positioned upon the crease plate 48, 48ª. During initial depression of the treadle 66 a shoulder 200 (Fig. 4) of an arm 202 operatively connected to the rod 188 swings rearward beneath an arm 204 keyed to the shaft 182. At this stage of the operation the bulger 68 or 68ª in the machine will return by spring action to its raised position should the treadle 66 be released in the event that the operator desires to reposition the shoe in the machine. When the operator, after having depressed the treadle 66 sufficiently to force under manually applied pressure the bulger 68, 68a against the work, has noted that said work is properly positioned in the machine, the treadle is further depressed against the yielding action of the spring 186 and a spring 206, causing a pin 208 secured to the treadle to lower a trip lever 210 thereby engaging a one-revolution clutch (not shown) to cause the pulley 156 to rotate the shaft 158 through one revolution and accordingly to rotate the cam 160 through one revolution. Rotation of the cam 160 causes the arm 180 secured to the shaft 182 to be swung clockwise, as viewed in Fig. 4, thereby forcing the arm 204 against the shoulder 200 of the arm 202 and accordingly depressing the rod 188 to force the median part of the heel seat portion 30 of the outsole 32 of the shoe 34 through the opening 50 or 50a and below the bottom surface 70 or 70a of the crease plate 48 or 48a. The link 168 is then lowered to effect forward movement of the knife slide 76 and accordingly the back knife 72 or 72a to form the heel seat tab 36 or 36a. As above explained, the shoulder forming knives 90 are moved toward each other, in response to retractive or rearward movement of the slide 76, to form the heel breast receiving shoulder 40 or 40a. The mechanism for actuating the bulgers 68, 68a and the tab forming knives 72, 72a is practically identical with corresponding mechanism disclosed in Patent No. 1,980,371 and accordingly need not be further described herein.

The tab forming knife 72 is adjustable in a knife carrier 212 which fits in grooves 214 formed in the lug 78 of the knife slide 76, the carrier being secured against longitudinal movement in said grooves by a screw 216 which, as best shown in Fig. 11, passes through a bore in said lug and is threaded into the carrier. Since the knife 72, the carrier 212 and the lug 78 are substantially identical with corresponding members of the machine disclosed in Patent No. 1,980,371 no further detailed description of this construction is included herein.

In operating upon Louis work the knife 72 is moved forward in response to forward movement of the knife slide 76 until its cutting edge 74, which runs along the bottom face 70 of the crease plate 48, arrives at the heel breast line 118 of the outsole 32 of the shoe 34 positioned in the machine, said heel breast line 118 being arranged just forward of the front or breast edges 100 of the crease plate 48 and being located in the fixed Louis heel breast line 111 of the machine. In operating upon Cuban work the knife 72a is moved forward in response to forward movement of the knife slide 76 until its concave cutting edge 74a, which runs along the bottom face 70a of the crease plate 48a, arrives at the heel breast line 118a of the outsole 32 of the shoe 34 positioned in the machine, said heel breast line 118a extending generally along the front or breast edges 100a of the plate 48a and lying substantially in a horizontal circle 211 (Figs. 17a, 17b) which may be described as the fixed Cuban heel breast line of the machine and has a radius equal to the transverse radius of curvature of the breast edges of the attaching faces of heels to be attached to the shoes being operated upon.

Figure 1:
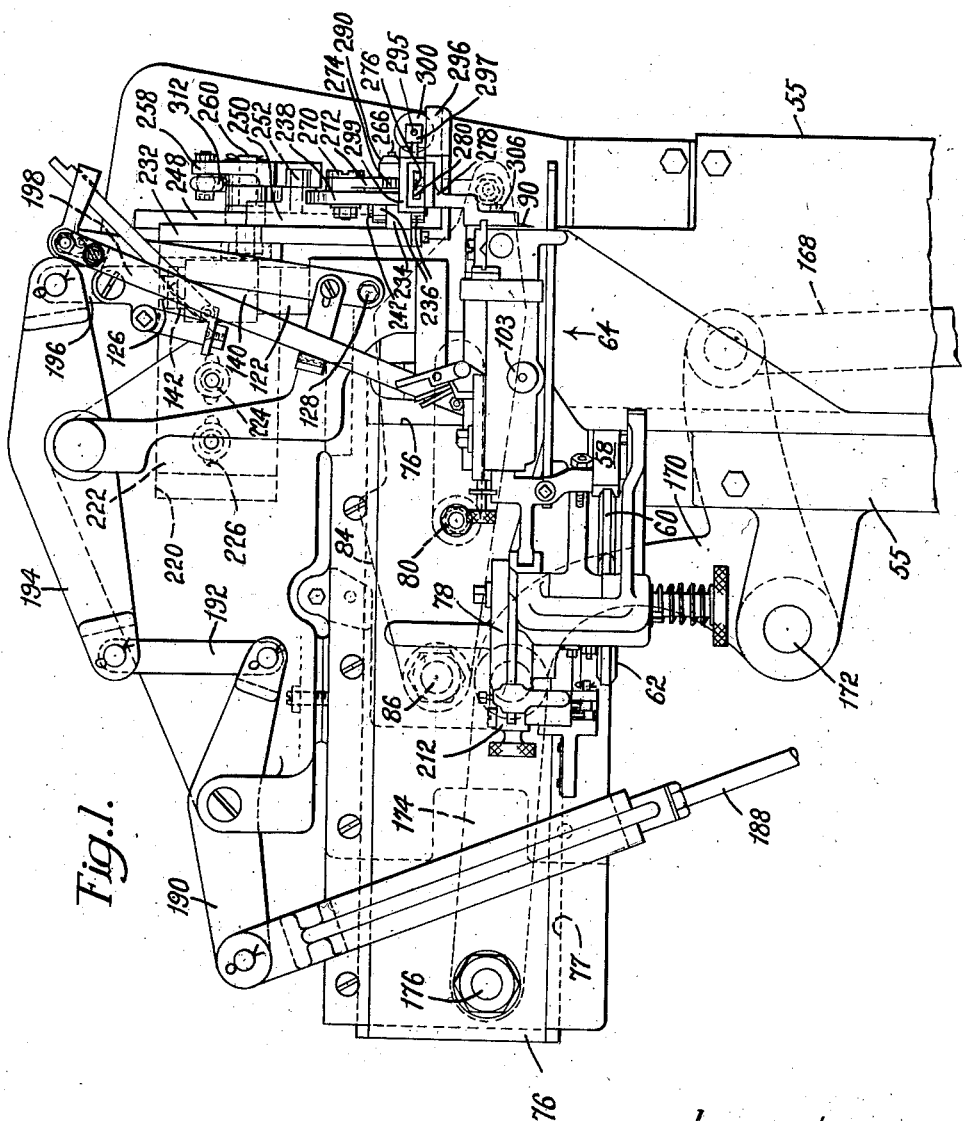
Figs. 1 and 2 are side and front views, respectively, of an operating head of an illustrative heel seat fitting machine which is adapted to provide the improved heel seat disclosed in said application Serial No. 345,913.
Figure 2:
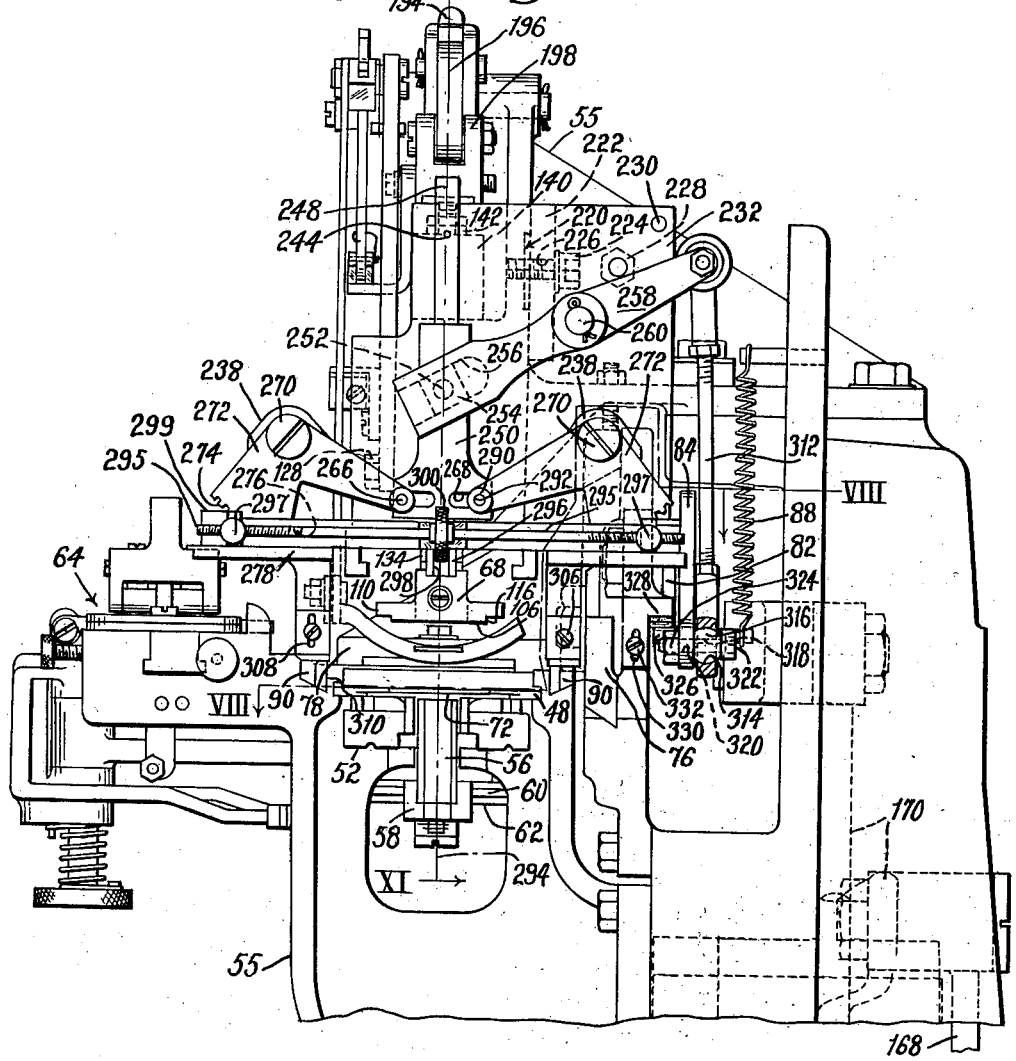
Figure 3:
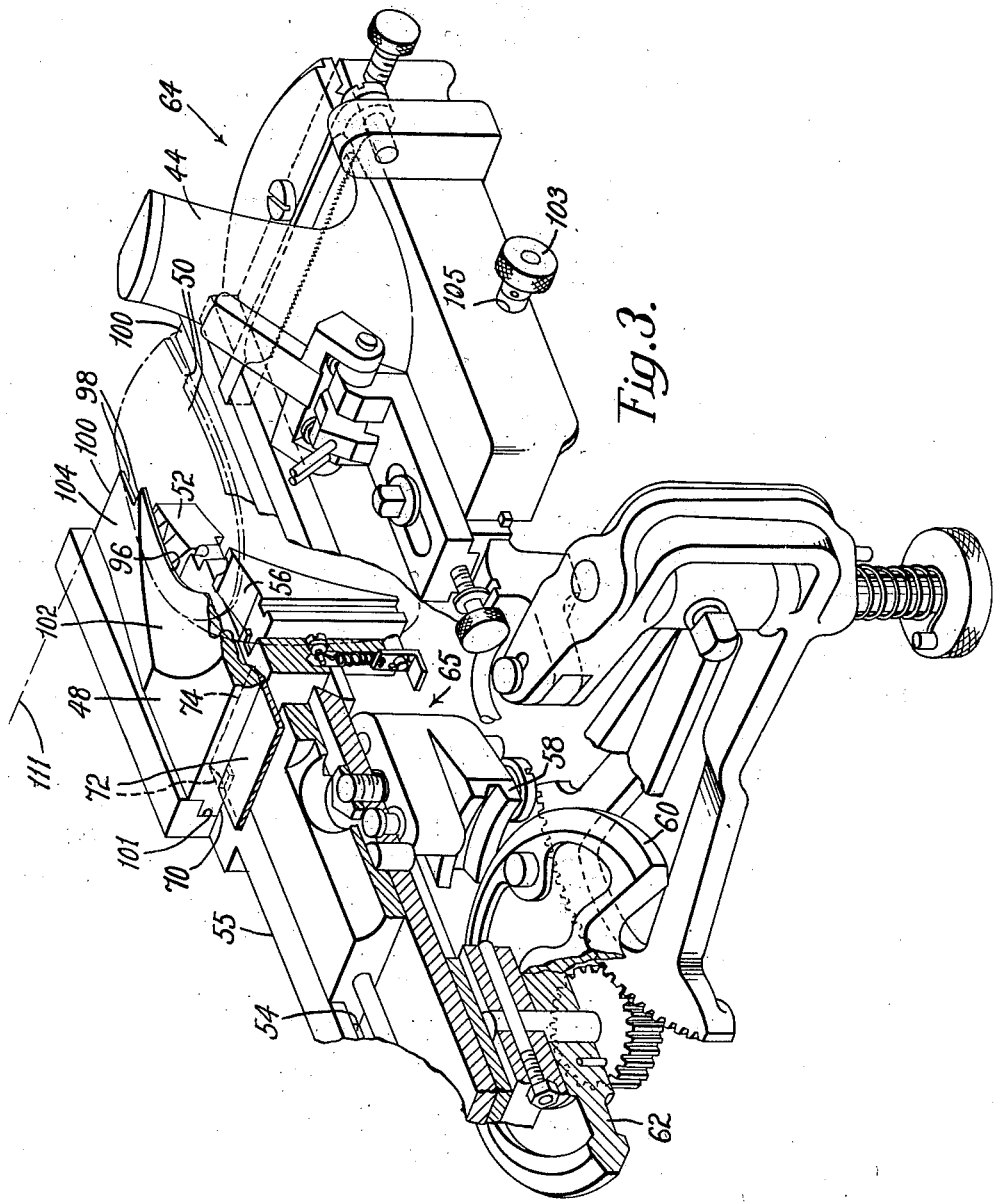
Fig. 3 is a perspective view, partly broken away and partly in section, showing in detail a heel measuring gage of the illustrative machine and mechanism for positioning a shoe in the machine in accordance with the setting of said gage.
Figure 7:
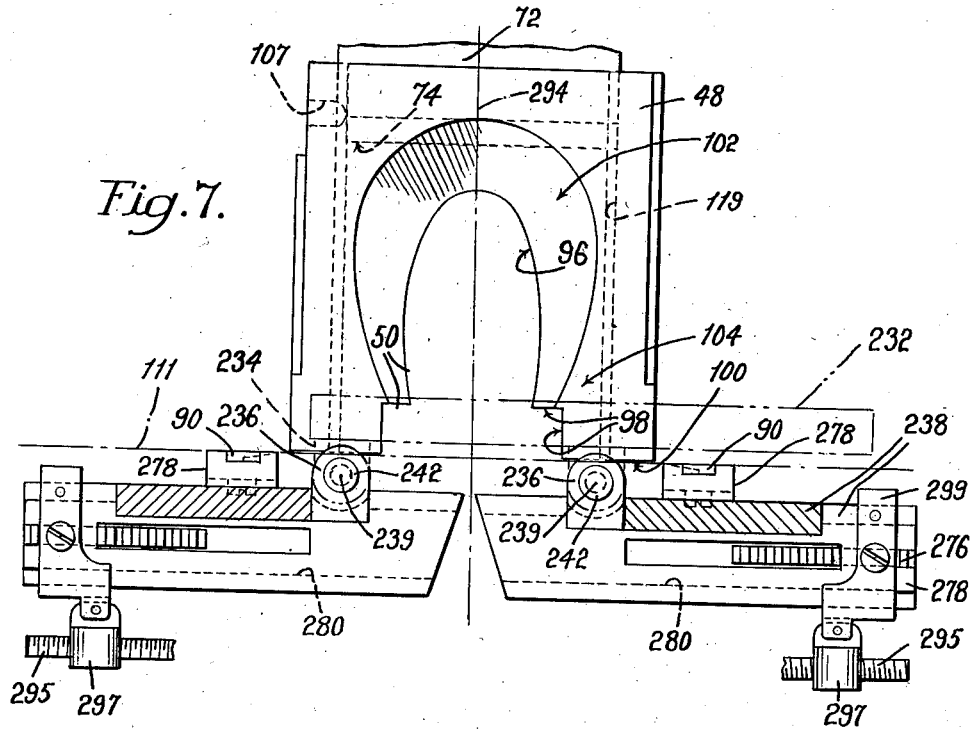
Fig. 7 is a view, partly on the line VII—VII of Fig. 5 and partly broken away, showing in plan a crease plate for use in operating upon Louis work and showing portions of guiding mechanism for shoulder forming knives which are used in operating upon Louis and Cuban work and are shown adapted to accommodate Louis work.

The shoulder forming knives 90 are constantly urged to their idle or retracted positions, best shown in Figs. 2 and 5, by hereinafter described mechanism actuated by the spring 88, and are positively moved inward simultaneously against the action of said spring, in response to rearward movement of the slide 76, to form the heel breast receiving shoulders 40, 40a. Formed in the main frame 55 is a horizontal channel 220 in which is initially secured in a predetermined position an angle bracket 222. The bracket 222 may be initially secured quickly and effectively in its adjusted position in the channel 220 by screws 224 which are threaded into the main frame 55 and pass through elongated slots 226 formed in said bracket. Secured by screws 228 (only one shown) and a dowel pin 230 to the forward end of the angle bracket 222 is a vertically disposed support plate 232 from the lower end of which project a pair of spaced bosses 234 each of which is straddled by upper and lower rearwardly extending flanges 236 formed on a guide block 238 and has a bore 240 for receiving a vertically disposed bearing pin 242 mounted in bores formed in said flanges. Secured by rivets 244 to the plate 232 and fitting in a vertical groove 246 in said plate is a guide rod 248 upon which is slidably mounted a slide 250. Pivotally mounted on a bearing pin 252 threaded into the slide 250 is a block 254 slidable in a guideway 256 formed in a lever 258 which is fulcrumed upon a bearing pin 260 mounted on the plate 232. The slide 250 has formed in its lower end a horizontal recess 262 in which fit slidingly and rotatably spherical portions 264 of rods 266 extending generally forward and rearward of the machine through slots 268 formed in front walls of the slide. Pivotally mounted upon shoulder screws 270, which are secured respectively to upstanding portions of the guide blocks 238, are right and left bell crank levers 272 outer arms of which are provided with gear segments 274 meshing with racks 276 formed at the upper ends of right and left knife carriers 278 slidable along T-shaped guideways 280 formed in the lower faces of the guide blocks 238. Formed at the inner ends of the bell crank levers 272 are bosses 290 having cylindrical bores 292 for receiving the rods 266 respectively. As will be explained later, in fitting the heel seat portions 30 of attached outsoles 32 of shoes 34 for the attachment of Louis heels 44 the guide blocks 238 have their guideways 280 in alinement and extending at right angles to a vertical central plane 294 through the crease plate 48 of the machine. When the machine is adjusted for fitting the heel seat portion 30 of an attached outsole 32 of a shoe 34 for the reception of a Cuban heel 44a the T-shaped guideways 280 extend rearward as they extend inward, as shown in dash lines in Figs. 6 and 17. In order to swing the guide blocks 238 into different adjusted positions about axes 239 of the bearing pins 242 the support plate 232 has secured to it a bracket 296 in a slot 298 of which fits a knurled disk 300 secured to a rod 295, right and left threaded portions of which are threaded respectively into blocks 297 pivotally mounted upon lugs 299 secured to the guide blocks 238. By rotating the disk 300 the guide blocks 238 may be quickly and effectively swung about the axes 239 into positions in which the T-shaped guideways 280 are disposed at different angles to the vertical central plane 294 which is coincident with a vertical central plane 294a (Fig. 17a) through the crease plate 48a.

The knife carriers 278 have depending arms in which are formed vertical slots 302 for receiving shanks 304 of the shoulder forming knives 90, said knives being secured in their proper adjusted positions upon the carrier with cutting edges 310 thereof arranged substantially vertical by screws 306 which pass through elongated slots 308 in the knife carriers and are threaded into the knives.

Universally connected to the upper end of the lever 258 is a multipart rod 312 the length of which may be varied, said rod having at its lower end a socket 314 (Fig. 2) in which is mounted for universal movement a sphere 316 having extending through it a bore 318. The forward end portion of the actuating lever 84 has formed in it an elongated slot 320 for receiving a shouldered bearing portion of a bolt 322 which extends through the bore 318 in the sphere 316 and is operatively connected to the lever by a nut 324.

Counterclockwise movement of the lever 84, as viewed in Figs. 9 and 10, and accordingly outward movement of the shoulder forming knives 90 under the action of the spring 88 is limited by the engagement of a stop screw 326, which is secured to the lever, with an adjustable bar 328 having formed in it slots 330 (only one shown) through which pass screws 332 used for securing the stop bar 328, in different heightwise positions, to the main frame 55.

Pivotally mounted upon a screw 339 secured to the lever 84 is a latch 338 which is constantly urged toward a rest position against a stud 342, which is secured to the lever, by a spring 340. When the machine is idle the cam 82, which is pivotally mounted upon a shoulder screw 334 secured to the lever 84, is in its full line position shown in Fig. 9, the forward end portion of said lever being in engagement with a stop pin 336 initially movable into different adjusted positions upon the lever, and the cam roll 80 being in its full line position spaced from the latch 338 which has a forwardly projecting lug 337.

When during the power cycle of the machine the knife slide 76 is moved forward the roll 80 engages the surface 344 of the cam 82 causing said cam to swing clockwise upon the lever 84, as viewed in Fig. 9, to a position above a hook portion 346 of the latch 348. During rearward or retractive movement of the slide 76 the roll 80 engages a surface 348 of the then latched cam 82 causing the lever 84 to swing downward about the bearing pin 86 and accordingly causing the shoulder forming knives 90 to swing equal distances toward each other and toward the central vertical plane 294 against the action of the spring 88 to form the heel breast receiving shoulders 40, 40ª. As the roll 80, during the end portion of the retractive movement of the slide 76 acts upon the lug 337 of the latch 338, said latch is moved from its full line position shown in Fig. 10 to its dash line position shown in Fig. 9 and allows the cam 82 to swing by the action of gravity to its full line idle position (Fig. 9) against the stop pin 336, the latch 338 then swinging to its rest position against the stud 342 and the lever 84 swinging to its rest position in which the stop screw 326 is in engagement with the stop bar 328.

The crease plates 48ª are positioned in the machine by the use of the spring-pressed pin 103 with their breast edges 100ª extending generally along a portion of the Cuban heel breast line 211 of the machine, the outer ends 109 of said breast edges being spaced apart a distance slightly greater than the distance between the opposite ends of the heel breast line 118ª of the outsole 32 of the largest shoe which is to be operated upon for the reception of a Cuban heel. Shoes which are to receive Cuban heels are positioned in the machine, as heretofore described, with the heel breast lines 118ª of their attached outsoles lying substantially in the Cuban heel breast line 211 of the machine.

In fitting attached outsoles, the heel seat portions of which have been deformed between the crease plate 48ª and the bulger 68ª, the cutting edges 310 of the knives 90 move along the lines 350 which extend along and are substantially parallel to the edges 100ª of the crease plates 48ª, said knives moving out of and over the outsole at points spaced substantial distances from the longitudinal median plane 93 of the outsole which plane coincides substantially with the vertical median plane 294ª of the crease plate 48ª. It will be noted that when the outsole 32 of the shoe 34 is being fitted its heel seat portion 30 is substantially flat transversely but springs back to its slightly transversely convex shape after the shoe has been removed from the machine. Accordingly, when the shoe is removed from the machine the outer end portions of the heel breast receiving shoulders 40ª formed upon the heel seat portion of the outsole of the shoe will shift slightly forward with relation to inner end portions of the shoulders, said shoulders assuming a slight transverse curvature approximating the transverse curvature of the attaching face end of the breast of the heel to be attached to the shoe.

The crease plate 48 is positioned in the machine with its breast edges 100 extending generally along the fixed heel breast line 111 of the machine and disposed at right angles to the vertical median plane 294 of the crease plate. A shoe which is to receive a Louis heel 44 is so positioned in the machine by mechanism heretofore described that the heel breast line 118 of its outsole is arranged just forward of the breast edges 100 of the crease plate 48 positioned in the machine and accordingly in the heel breast line 111 of the machine. The distance between points 109 where the Cuban heel breast line 211 of the machine intersects the Louis heel breast line 111 is slightly greater than the distance between the opposite ends of the heel breast line 118 or 118ª of the outsole 32 of the largest shoe 34 which is to be operated upon.

The axes 239 of the bearing pins 242 upon which the guide blocks 238 are fulcrumed are disposed at right angles to the faces 70, 70ª of the crease plates 48, 48ª positioned in the machine and extend and are arranged in the vincinity of the points of intersection of the Cuban and Louis heel breast lines 211 and 111 respectively of the machine which points of intersection are arranged in close proximity to the ends 109 of the breast edges 100ª. The vertical cutting edges 310 of the knives 90 mounted for operating upon Louis or Cuban work respectively move along the edges 100, 100ª of the crease plates 48, 48ª respectively and accordingly move along the fixed Louis heel breast line 111 or, in accordance with their setting for Cuban work, in the paths 350 which extend approximately along adjacent portions of the Cuban heel breast line 211 of the machine. Although it may be desirable to have the axes 239 of the bearing pins 242 pass approximately through the points of intersection of the Cuban and Louis heel breast lines 211, 111 it has been found satisfactory and more convenient from a construction standpoint if the bearing pins are so located that their axes are spaced slightly forward of and in close proximity to said points of intersection as illustrated.

By so constructing the machine that the fixed Louis and Cuban breast lines 111 and 211, lie in a horizontal plane and intersect at two points adjacent to the outer edges of the breast edges 100ª and by causing the guide blocks 238, which have formed in them the knife holder guideways, to pivot about vertical axes which are arranged in the vicinity of said points, the shoulder forming knives 90 may be selectively moved along the front edges 100, 100ª of the crease plates 48, 48ª to adapt the machine to fit the heel seat portions of outsoles of shoes for the reception of either Louis or Cuban heels without any further adjustments of the crease plates or the shoulder forming mechanism.

Having thus described our invention, what we claim as new and desire to secure by Letters Patent of the United States is:

1. In a heel seat fitting machine, a crease plate which has breast edges and which has converging dished and planar faces in which is formed an opening comprising a rear U-shaped portion and a forward rectangular portion having lateral margins projecting equal distances laterally of said U-shaped portion and a forward end terminating at said breast edges, a bulger which is movable in a path arranged at right angles with said planar face and is adapted to force the heel seat portion of an outsole of a shoe through said opening and beyond said planar face of the crease plate, a knife having a cutting edge, means for moving the knife toward the breast edges of the crease plate with the cutting edge of the knife in engagement with said planar face to form on the heel seat portion of the outsole a heel seat tab having at its forward lateral margins laterally extending wings, said crease plate having formed in it guideways for slidingly receiving said knife to insure that during the tab forming operation the cutting edge of said knife shall not be deflected away from the planar face of the crease plate by pressure of the outsole, and means for forming heel breast receiving shoulders upon the outsole.

2. In a heel seat fitting machine, a crease plate having breast edges and planar and outsole supporting faces respectively in which is formed an opening defined by a U-shaped edge and by pairs of angularly disposed edges which extend respectively laterally outward from the forward ends of the U-shaped edge and then forward to said breast edges, a bulger provided with an operating face having an outline similar to but somewhat smaller than said opening, means for positioning a heel seat portion of an attached outsole of the shoe upon the crease plate, means for forcing said operating face of the bulger against a median part of the heel seat portion of the outsole to force said part through said opening and beyond said planar face of the crease plate, a knife having a cutting edge, means for moving the knife lengthwise of said plate toward said breast edges with its cutting edge in engagement with said planar face to form a heel seat tab upon the heel seat portion of the outsole, said crease plate having formed in it guideways which extend substantially the length of said plate and into which the knife fits slidingly thereby constraining the cutting edge of the knife from being moved away from said planar face by the action of the outsole against it during the forming of said heel seat tab, and means for forming heel breast receiving shoulders upon the outsole.

3. In a heel seat fitting machine, a crease plate through and into the forward end of which extends an opening which has symmetrical halves and the front and rear portions of which are relatively wide and narrow respectively, said crease plate having a face bordering said opening, a bulger having a deforming face defined by an edge which face is smaller than but approximately complemental to the opening, said bulger having at its forward lateral portions clamping faces which are set back and are offset laterally from said deforming face, means for moving the bulger toward the crease plate to force the heel seat portion of an outsole through said opening and beyond said face of the crease plate to an extent determined by the clamping of the outsole between the crease plate and the clamping faces of the bulger, a knife movable along said face of the crease plate to form upon the outsole a heel seat tab having at its forward lateral margins laterally extending wings, and knives for forming heel breast receiving shoulders on the outsole.

4. In a heel seat fitting machine, a crease plate through and into the forward end of which extends an opening which has symmetrical lateral halves and front and rear portions of which are relatively wide and narrow, said crease plate having upper and lower faces bordering said opening, means comprising a bulger movable toward the crease plate to force with bending and clamping action the median part of the heel seat portion of the outsole through said opening and below the lower face of the crease plate and to force with crushing action inner portions of the forward lateral margins of the heel seat portion of the outsole through said opening and also to force outer portions of said forward lateral margins against said upper face of the crease plate to limit movement of the bulger toward the crease plate, a knife movable along the lower face of the crease plate for forming a heel seat tab upon the heel seat portion of the outsole, and means for forming heel breast receiving shoulders upon the outsole.

5. In a heel seat fitting machine, a crease plate through and into a forward end of which extends an opening defined by an edge having forward and rear portions and which has a face bordering said edge, a bulger having a face defined by an edge which has forward and rear portions and is substantially complemental to but somewhat smaller than the opening defined by said edge of the crease plate, and means for moving the bulger toward the crease plate to force with deforming action a median part of a heel seat portion of an outsole supported by said plate through the opening and beyond said face of the crease plate, said rear portion of said edges of the bulger and the crease plate respectively being spaced, during the deforming of the outsole, by a distance approximately equal to the thickness of an adjacent portion of the outsole to cause said adjacent portion to be deformed by a bending and clamping action, and forward portions of the edges of the bulger and the crease plate respectively being spaced, during the deforming of the outsole, by distances less than the thickness of adjacent portions of the outsole to cause forward lateral margins of the outsole to be deformed by crushing action between the bulger and the crease plate, said bulger having stepped laterally projecting portions provided with faces for forcing said lateral margins of the heel seat portion of the outsole against the crease plate to limit outsole deforming movement of the bulger.

6. In a heel seat fitting machine, a crease plate through and into a forward end of which extends an opening having a rear portion defined by a U-shaped edge and having an entrant portion defined by angled edges extending respectively laterally and then forwardly from opposite ends of the U-shaped edge, said crease plate also having a face bordering said edges, a bulger having a face which is defined by a U-shaped edge and by angled edges extending respectively laterally and then forwardly from the forward ends of the U-shaped edge and which is substantially complemental to but somewhat smaller than the opening defined by said edges of the crease plate, and means for moving the bulger toward the crease plate to force a median part of a heel seat portion of an outsole supported by said plate through the opening and beyond said face of the plate, the U-shaped edge of the bulger and the U-shaped edge of the crease plate being spaced, during the deforming of the outsole, by a distance approximately equal to the thickness of an adjacent portion of the outsole to cause said adjacent portion to be deformed by a bending and clamping action, and the angled edges of the bulger and the crease plate being spaced, during the deforming of the outsole, by a distance less than the thickness of adjacent parts of the outsole to cause said adjacent parts of the outsole to be deformed by crushing action by the bulger and the crease plate, said bulger having stepped laterally projecting portions provided with faces for forcing forward lateral margins of the heel seat portion of the outsole against the crease plate to limit outsole deforming movement of the bulger.

7. In a heel seat fitting machine, a crease plate which has opposed edges spaced from one another to form an opening and which has a face bordering said opening, a bulger which is rabbeted to form near its lateral margins shoulders extending generally heightwise and lengthwise and which has clamping faces angularly disposed to and extending laterally outward from said shoulders, means for moving the bulger at substantially right angles to said face of the crease plate to force, until said movement of the bulger is limited by the clamping of a heel seat portion of an outsole which is supported by the crease plate between the clamping faces of the bulger and the crease plate, a median part of said heel seat portion of the outsole through the opening and beyond said face of the crease plate, said shoulders of the bulger and the edges of the crease plate, during the deforming of the heel seat portion of the outsole, forming between them gaps which are of less width than the thickness of adjacent margins of the outsole with the result that the shoulders of the bulger and the edges of the crease plate deform said margins of the outsole with crushing action and cooperate to insure against any displacement of said adjacent margins of the outsole, a knife movable along said face of the crease plate to form a heel seat tab upon the deformed heel seat portion of the outsole, and means for forming heel breast receiving shoulders upon said outsole.

8. In a heel seat fitting machine, a crease plate having breast edges and having extending through it and to its breast edges an opening defined by a rear U-shaped edge and a pair of angularly disposed edges which extend outward from the forward ends of the U-shaped edge and then forward to the breast edges of the crease plate, said crease plate having outsole and knife receiving faces bordering said opening, a bulger having a deforming face which is defined by a U-shaped edge and by a pair of angularly disposed edges extending outward from opposite ends of the U-shaped edge of the bulger and then forward and which is generally complemental to the opening of the crease plate, said bulger having at its forward lateral margins rabbets comprising clamping faces which are offset heightwise and widthwise of the bulger from the deforming face, means for moving the bulger at substantially right angles to the knife receiving face of the crease plate and toward said plate to force the median part of the heel seat portion of an outsole on said outsole receiving face of the crease plate through said opening and beyond the knife receiving face of the crease plate until said clamping faces of the bulger have firmly clamped margins of the outsole against the outsole receiving face of the crease plate, said angularly disposed edges of the crease plate and the bulger, during the deforming of the outsole, being spaced by gaps which are of less width than adjacent portions of the outsole and being adapted to deform adjacent portions of the outsole by offset crushing action along angular lines and to secure the outsole against movement, a knife movable along said knife receiving face of the crease plate to form upon the heel seat portion of the outsole a heel seat tab having at its forward lateral margins laterally projecting wings which are beveled rearwardly and outwardly of the outsole, and means for forming heel breast receiving shoulders upon the outsole.

9. In a heel seat fitting machine, a crease plate which has an opening arranged generally in a plane and which is adapted to support the heel seat portion of an attached outsole of a shoe, a bulger having a leading deforming face arranged generally parallel to said plane and having trailing clamping faces which are set back and are offset laterally from said deforming face and which are arranged generally parallel to said plane, means for moving at substantially right angles to said plane the bulger relatively to the crease plate to cause said deforming face of the bulger to force the median part of the heel seat portion of the outsole through said opening and to cause said clamping faces of the bulger to force the outsole against said plate to limit movement of the bulger in said direction and accordingly to limit the forcing of the outsole into the opening, and a knife movable along the crease plate for reducing the heel seat portion of the outsole, said means being adapted to maintain the bulger at rest during the heel seat reducing operation of the knife.

10. In a heel seat fitting machine, means for supporting and positioning a heel seat portion of an outsole, means for relatively deforming the median and marginal portions of the heel seat portion of the outsole thicknesswise of said outsole, a knife movable generally lengthwise of the deformed outsole from a retracted to a projected position to form a heel seat tab on said heel seat portion, shoulder forming knives movable inward from retracted positions at opposite sides of the outsole to form heel breast receiving shoulders on said outsole, mechanism comprising resilient means for constantly urging the shoulder forming knives toward their retracted positions, and means responsive to movement of the tab forming knife toward its retracted position for moving, against the action of said resilient means, the shoulder forming knives inward from opposite sides of the outsole to form said heel breast receiving shoulders.

11. In a heel seat fitting machine, means for supporting and positioning a heel seat portion of an outsole, means for relatively deforming the median and the marginal portions of the heel seat portion of the outsole thicknesswise, a knife movable lengthwise of the deformed outsole from a retracted position to a projected position to form a heel seat tab on the heel seat portion of the outsole, shoulder forming knives movable inward from retracted positions at opposite sides of the outsole to form heel breast receiving shoulders on said outsole, mechanism comprising resilient means for constantly urging the shoulder forming knives toward their retracted positions, a pivotally mounted lever, means for moving said tab forming knife to and from its projected position, a cam journaled on said lever, and spring actuated means which is carried by the lever and is movable to one position to enable it to lock the cam in an active position on the lever and which is movable to a second position to cause it to release the cam for movement to an inactive position on the lever, said spring actuated means being moved to said one position and said cam thereafter being moved to its active position on the lever in response to movement of the tab forming knife toward its projected position, said means for moving the tab forming knife, during movement of the tab forming knife to its retracted position, being adapted to engage the cam locked to said lever to swing said lever against action of said resilient means whereby to move said shoulder forming knives inward from opposite sides of the outsole.

12. In a heel seat fitting machine, interchangeable Cuban and Louis crease plates each of which has a pair of breast edges and an opening extending through it and into its breast edges and which has a planar face bordering said opening, means for selectively positioning said Louis and Cuban crease plates one at a time in the machine with their respective breast edges arranged in a common plane and the positions occupied by the breast edges of the Cuban crease plates positioned in the machine intersecting respectively at two points the positions occupied by the breast edges of the Louis crease plates positioned in the machine, a bulger cooperating with one of the crease plates in the machine for deforming the heel seat portion of an outsole, a knife movable along the planar face of the one crease plate to form a heel seat tab on the heel seat portion of the outsole, a pair of blocks having guideways, knives movable toward one another along said guideways from opposite sides of the outsole to form heel breast receiving shoulders upon said outsole at the forward end of said heel seat tab, and means for initially swinging the blocks into different adjusted positions about axes respectively which are disposed at substantially right angles to said planar face of the crease plate positioned in the machine and which are arranged respectively in the vicinity of the points of intersection of the breast edges of the Louis and Cuban crease plates positioned in the machine.

References Cited in the file of this patent

UNITED STATES PATENTS

| | | |
|---|---|---|
| 1,307,284 | Wentworth | June 17, 1919 |
| 2,323,407 | Miller et al. | July 6, 1943 |